US012656862B2

(12) United States Patent
Petersen et al.

(10) Patent No.: US 12,656,862 B2
(45) Date of Patent: Jun. 16, 2026

(54) METHOD FOR DETECTING GESTURES OF AN EYE

(71) Applicant: Robert Bosch GmbH, Stuttgart (DE)

(72) Inventors: Andreas Petersen, Stuttgart (DE); Thomas Alexander Schlebusch, Stuttgart (DE); Johannes Meyer, Stuttgart (DE); Hans Spruit, Ulm (DE); Jochen Hellmig, Ulm (DE)

(73) Assignee: Robert Bosch GmbH, Gerlingen (DE)

( * ) Notice: Subject to any disclaimer, the term of this patent is extended or adjusted under 35 U.S.C. 154(b) by 377 days.

(21) Appl. No.: 18/283,278

(22) PCT Filed: Mar. 8, 2022

(86) PCT No.: PCT/EP2022/055805
§ 371 (c)(1),
(2) Date: Sep. 21, 2023

(87) PCT Pub. No.: WO2022/223192
PCT Pub. Date: Oct. 27, 2022

(65) Prior Publication Data
US 2024/0176136 A1      May 30, 2024

(30) Foreign Application Priority Data

Apr. 21, 2021    (DE) ..................... 10 2021 110 109.3

(51) Int. Cl.
*G06F 3/01* (2006.01)
*G02B 27/00* (2006.01)
*G02B 27/01* (2006.01)

(52) U.S. Cl.
CPC ......... *G06F 3/013* (2013.01); *G02B 27/0093* (2013.01); *G02B 27/0172* (2013.01); *G02B 2027/0178* (2013.01)

(58) Field of Classification Search
CPC . G06F 3/013; G02B 27/0093; G02B 27/0172; G02B 2027/0178
See application file for complete search history.

(56) References Cited

U.S. PATENT DOCUMENTS 8,824,779 B1     9/2014  Smyth
10,860,098 B1    12/2020  Stratton
(Continued)

FOREIGN PATENT DOCUMENTS

DE      10 2018 214 637 A1      3/2020
KR          20020059635 A  *  7/2002    ......... A61F 9/00806
(Continued)

OTHER PUBLICATIONS

International Search Report from International Application No. PCT/EP2022/055805, mailed on Sep. 23, 2022, 5 pages.
(Continued)

*Primary Examiner* — Towfiq Elahi
(74) *Attorney, Agent, or Firm* — Tucker Ellis LLP

(57) ABSTRACT

A method for identifying eye gestures of an eye includes the steps of emitting at least one laser beam onto the eye, determining a single measuring sample having current values for: an optical path length of the emitted laser beam; a signal-to-noise ratio of radiation scattered back from the eye; an eye speed of the eye; and identifying an eye gesture based on the single measuring sample, wherein the optical path length is determined based on laser feedback interferometry of the emitted laser radiation with the radiation scattered back from the eye, and wherein the eye speed is determined based on a Doppler shift of the emitted radiation and the radiation scattered back, determined by means of the laser feedback interferometry.

15 Claims, 6 Drawing Sheets

(56)        References Cited

U.S. PATENT DOCUMENTS

| | | | |
|---|---|---|---|
| 2017/0261610 A1 * | 9/2017 | Scally | G01S 15/50 |
| 2017/0276934 A1 | 9/2017 | Sarkar | |
| 2020/0022577 A1 * | 1/2020 | Rishoni | A61B 3/113 |
| 2020/0200522 A1 | 6/2020 | Huang et al. | |

FOREIGN PATENT DOCUMENTS

| | | | | |
|---|---|---|---|---|
| KR | 20210042784 A | * | 4/2021 | G01C 3/02 |
| WO | WO-2020043472 A1 | * | 3/2020 | G02B 5/32 |

OTHER PUBLICATIONS

Office Action from corresponding German Application No. 10 2021 110 109.3 mailed on Apr. 14, 2022, 9 pages.
Pruijmboom, Armand, et atl., "VCSEL-based miniature laser-Doppler interferometer", Proc. of SPIE, (2008), vol. 6908, pp. 690801-1-690801-7.

* cited by examiner

Fig. 4
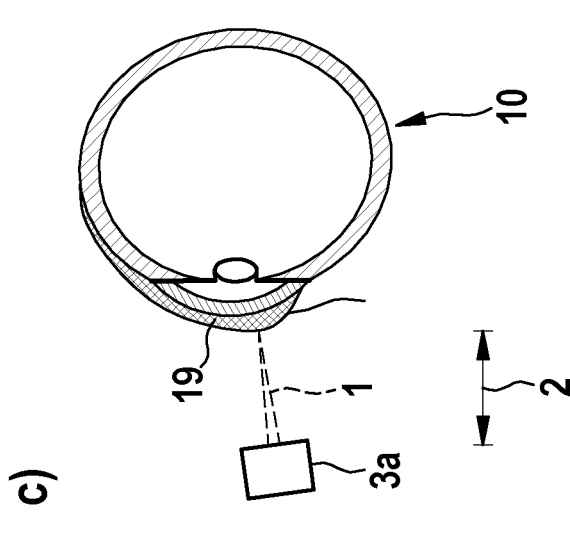
c)
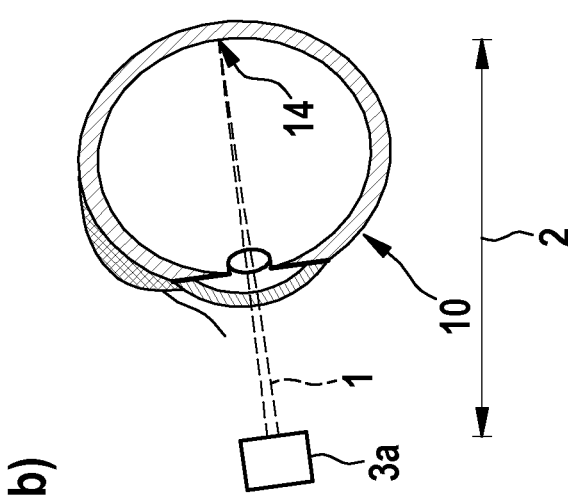
b)
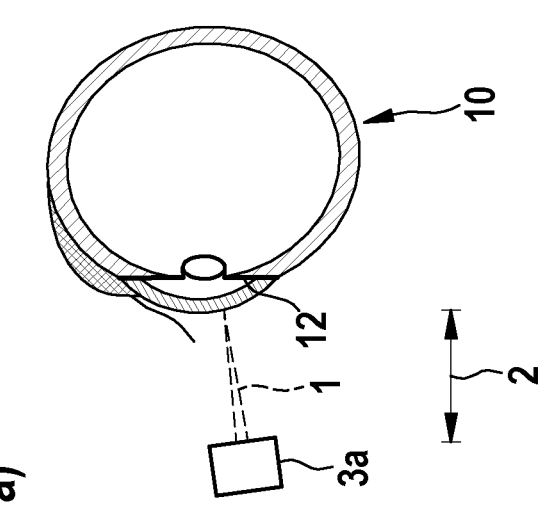
a)

60

65

66          67          68

METHOD FOR DETECTING GESTURES OF AN EYE

RELATED APPLICATION DATA

This application is a National Phase Application of International Application No. PCT/EP2022/055805 filed Mar. 8, 2022, which claims benefit of German Application No. DE 10 2021 110 109.3 filed Apr. 21, 2021, the entireties of which are incorporated by reference herein.

PRIOR ART

The present invention relates to a method for identifying eye gestures of an eye, and to smartglasses.

The use of eye-tracking or gaze detection (also: oculography) for determining eye movements and for estimating a viewing direction is known. In this case, eye gestures can be identified by tracking the viewing direction. Known systems are frequently based on the detection of information via the eye position by means of camera-based systems, or electrical or electromagnetic sensors in the region of the eye. Furthermore, scanning laser systems are known, which scan a laser spot over the eye by means of a micromirror, for example. All these systems are typically highly complex and have a high energy consumption at restricted temporal resolution.

Disclosure of the Invention

In contrast, the method according to the invention having the features of claim 1 is characterized by a particularly energy-saving and cost-effective possibility for identifying eye gestures. This is achieved by a method for identifying eye gestures. In this case, the method comprises the steps of:

emitting at least one laser beam onto the eye;

determining a single measuring sample having current values for: an optical path length of the emitted laser beam, a signal-to-noise ratio of radiation scattered back from the eye, and an eye speed of the eye; and identifying an eye gesture based on the single measuring sample.

In this case, the optical path length is determined based on laser feedback interferometry of the emitted laser radiation with the radiation scattered back from the eye. Furthermore, the eye speed is determined based on a Doppler shift of the emitted radiation and the radiation scattered back, determined by means of the laser feedback interferometry.

In other words, in order to identify the eye gesture a laser beam, which is in particular emitted from a laser source, is emitted onto an eye of a user. In this case, the laser beam is scattered back on the eye, at least in part. In this case, the radiation that is scattered back is considered to be the portion of the radiation scattered at the eye, which is in parallel with the emitted laser beam, and thus can also be superimposed therewith. This portion that is scattered back interferes with the incident laser radiation, i.e. with the laser radiation propagating towards the eye. A superimposition of the emitted laser beam with the radiation that is scattered back takes place by means of what is known as laser feedback interferometry, such that there is a resulting interference radiation. This resulting interference radiation can for example be detected by means of a detector and analyzed.

In this case, an optical path length of the emitted laser beam is determined based on the laser feedback interferometry. A distance covered by the emitted laser beam from the laser source to the eye is considered an optical path length. That is to say that, provided that the laser beam is emitted from a laser source directly onto the eye, the optical path length corresponds to the distance between the laser source and the eye. For example, in the case of a known wavelength of the emitted laser radiation, the optical path length can be estimated on the basis of a constructive or destructive interference.

Preferably, a wavelength-modulated laser beam is emitted as a laser beam, particularly preferably as laser light of which the wavelength is triangle-modulated. By analysis of the interfering emitted radiation and radiation scattered back, in particular by calculating an average of the resulting radiation with respect to the two flanks of the triangle-modulated signal, the optical path length and direction of the eye speed can be determined in a particularly simple manner.

Furthermore, if there is a movement of the eye relative to the laser radiation scattered in, a Doppler shift of the emitted radiation and the radiation scattered back takes place on account of the Doppler effect. This Doppler shift can be detected by means of the laser feedback interferometry. On the basis of the Doppler shift, the eye speed can subsequently be determined. In this case, a tangential speed of a point on the eye surface, wherein this point corresponds to the point at which the laser radiation strikes the eye surface, is considered to be the eye speed. The eye speed preferably comprises an absolute value for the current speed, and a direction of the current speed.

In addition, the signal-to-noise ratio of the radiation scattered back is detected. For example, a reflectivity of the scattering surface can be determined on the basis of the signal-to-noise ratio. The reflectivity is in particular different for different regions of the eye. In particular, the determined reflectivity changes if the laser beam strikes anatomically different regions of the eye, such as the iris or the pupil or an eyelid. As a result, it is possible to estimate, for example, the region of the eye on which the laser beam is currently emitted.

In this case, the values for the optical path length, the signal-to-noise ratio, and the eye speed are determined simultaneously and combined to form the single measuring sample. On the basis of the single measuring sample, which thus comprises these specific variables for exactly one predefined timepoint, the eye gesture is identified, in the method.

The method offers the advantage that eye gestures can already be identified on the basis of a single measuring sample. That is to say that no tracking, for example of a viewing direction or an eye position, over a specific time period is required, but rather it is possible to estimate the eye gesture currently being performed, on the basis of the measuring samples recorded at exactly one specific time-point. A latency of the determination with respect to the eye gesture performed by a user can, by means of the method, in particular be zero or even negative, i.e. the eye gesture can be estimated or predicted even before it has been completed. The method thus makes it possible, in a particularly simple and efficient manner, to identify eye gestures with a particularly high degree of user comfort. In this case, the special type of identification of the eye gestures by means of laser feedback interferometry offers the advantage of a particularly high temporal scanning rate, such that the eye gestures can be identified in a temporally particularly highly resolved manner. Furthermore, the method offers the advantage that simple and cost-effective components, which have a low energy requirement, can be used. In this case, it is furthermore advantageous that no moving components, such as scanning devices, are required, as a result of which flexible and robust usage possibilities are available.

Preferred developments of the invention are found in the dependent claims.

Preferably, in the method, predefined basic eye gestures are identified on the basis of an interpretation of the measuring sample by means of a decision tree. The predefined basic eye gestures preferably include the following eye gestures: eye moves upwards, eye moves downwards, eye moves towards the left, eye moves towards the right, standstill of the eye, eye is closed, blinking. Particularly preferably, the mentioned eye gestures can be broken down further by an additional distinction of speed and/or duration of the eye gesture carried out. The decision tree preferably comprises a plurality of comparison operators, by means of which in each case at least one of the three components of the measuring sample is analyzed and categorized. A particularly simple and efficient algorithm for identifying the eye gestures can be provided by the decision tree.

Particularly preferably, predefined complex eye gestures are identified by means of a state machine. In this case, a complex eye gesture is defined by a predefined sequence of a plurality of basic eye gestures carried out in succession. An example for a complex eye gesture is a sequence of the following basic eye gestures: eye moves towards the right, eye moves towards the left, blinking. As a result, an efficient algorithm can be provided in a manner that is particularly simple and cost-effective to implement, by means of which algorithm any complex eye gestures, for example which can be programmed by the user, can be identified. This identification of the complex eye gestures can be advantageously used for example for actuating smartglasses, preferably for controlling commands, such as for making a call.

Preferably, in the method, the following predefined basic states are distinguished based on the optical path length and/or based on the signal-to-noise ratio:

laser beam strikes eyelid,
laser beam strikes eye surface or iris,
laser beam strikes retina.

Preferably, these basic states can be distinguished in this case by comparison of the respective determined associated values for optical path length and/or signal-to-noise ratio. Eye gestures can be identified particularly simply and reliably by distinguishing these basic states, since these basic states in particular generate significantly different measuring samples.

More preferably, the predefined basic states are additionally distinguished based on anatomical boundary conditions of a human eye. Known typical dimensions of the human eye are considered anatomical boundary conditions, which dimensions differ clearly for the mentioned basic states, on account of anatomical conditions. Preferably, in this case it is distinguished, based on the determined optical path length, which of the basic states is present. Particularly preferably, in this case the states of laser beam strikes eyelid, and laser beam strikes eye surface or iris, differ by approximately 1 mm. The states of laser beam strikes eye surface, and laser beam strikes retina differ by approximately 24 mm, which for example approximately corresponds to the eye diameter of the eye. It is thus possible to determine, particularly simply and reliably, which of the basic states is present. In this case, in particular an exact measurement and complex analysis of the currently detected optical path length is not necessary, but rather an estimation and setting into a ratio with values determined for basic states that are already known can be sufficient.

The method preferably furthermore comprises the steps of:

calibration by recording in each case a calibration signal-to-noise ratio for each of the three predefined basic states, and checking the plausibility of the determined measuring sample by comparing the current signal-to-noise ratio with the calibration signal-to-noise ratios.

In other words, the calibration is carried out before eye gestures are identified, wherein in a calibration signal-to-noise ratio is detected, and preferably stored, in each case for each of the three predefined basic states. Subsequently, if the identification of the eye gestures is intended to be carried out on the basis of a specific measuring sample, the plausibility of the signal-to-noise ratio of said measuring sample can be checked on the basis of the three calibration signal-to-noise ratios. In particular, in this case, the current measuring sample can be rejected or labelled as incorrect if the plausibility check fails, i.e. if it is not possible to match the current signal-to-noise ratio to one of the three calibration signal-to-noise ratios. As a result, particularly precise processing of the measuring sample can be carried out, in order to be able to identify eye gestures in a particularly reliable manner. The plausibility check on the basis of the signal-to-noise ratio is particularly advantageous since this is in particular independent of a distance of the laser source from the eye, such that for example slippage of the smartglasses relative to the eye does not have any influence.

The method particularly preferably furthermore comprises the steps of:

comparing the eye speed with a first eye speed, and
identifying a standstill of the eye, or alternatively an eye that is closed by an eyelid, if the eye speed of the measuring sample is less than or equal to the first eye speed.

In other words, it is identified that, if the speed is zero or very low, the eye is either closed by the eyelid, or alternatively is open and not moving. The first speed is preferably 0.5 m/s. Preferably these two cases, i.e. standstill or closed eye, can additionally be distinguished based on the optical path length and/or the signal-to-noise ratio.

The method preferably furthermore comprises the steps of:

comparing the eye speed with a first speed, and
identifying a movement of the eye or a blink if the eye speed is greater than the first speed. In this case, this first speed preferably corresponds to the first speed mentioned in the preceding paragraph. Particularly preferably, both cases, i.e. the movement of the eye or blinking, can additionally be distinguished based on the optical path length and/or the signal-to-noise ratio.

Further preferably, the method furthermore comprises the steps of:

comparing the eye speed with a second eye speed, which is preferably greater than the first eye speed, and
if the eye speed is less than or equal to the second speed: identifying a slow eye movement of the eye, or
if the eye speed is greater than the second speed: identifying a rapid eye movement of the eye.

Rapid eye movement or slow eye movement can thus constitute a sub-classification of each of the basic eye movements which contain a movement of the eye, in order to be able to identify a yet larger number of predefined eye movements by means of the method. The first eye speed is preferably 0.5 m/s.

Particularly preferably, in the method, two laser beams are emitted onto the eye. In this case, a first of these two laser beams is emitted onto the eye in such a way that it comprises a portion in parallel with a first axis of rotation of the eye, in order to be able to detect a first eye speed along said first axis of rotation. A second laser beam is furthermore emitted onto the eye in such a way that it comprises a portion in parallel with a second axis of rotation of the eye, which is preferably perpendicular to the first axis of rotation, in order to detect a second eye speed of the eye along the second axis of rotation. As a result, predefined eye gestures can be distinguished in a particularly simple and reliable manner.

The method preferably furthermore comprises the step of: determining an eye angle ε based on the equation:

$$\varepsilon = \arctan\left(\frac{v\theta}{v\varphi}\right),$$

with the first eye speed vθ and the second eye speed vφ. In particular, processing of the measurement data in polar coordinates thus takes place.

The following eye gestures are preferably distinguished, based on the eye angle ε:

eye moves upwards, if the eye angle ε is greater than or equal to 45° and smaller than 135°, eye moves downwards, if the eye angle ε is greater than or equal to 225° and smaller than 315°, eye moves towards the left, if the eye angle ε is greater than or equal to 135° and smaller than 225°, eye moves towards the right, if the eye angle ε is greater than or equal to 315° and smaller than 45°.

This processing in polar coordinates thus makes it possible to identify the movements of the eye in the different directions in a particularly simple manner, based on the described classification. Preferably, the described angle ranges can also be broken down yet further, in order to be able to distinguish an even larger number of eye gestures, such as eye moves upwards and towards the left. Particularly preferably, the angle ranges are broken down in order to be able to distinguish a total of 8 or 16 predefined movement directions.

The method preferably furthermore comprises the step of: determining a magnitude v of the eye speed based on the equation:

$$v = \sqrt{v\theta^2 + v\varphi^2},$$

with the first eye speed vθ and the second eye speed vφ.

More preferably, the method is used for operating smartglasses, and furthermore comprises the step of:

identifying a movement of the smartglasses relative to the eye, based on the optical path lengths of at least two measuring samples. That is to say that it is identified, on the basis of at least two measuring samples recorded at different time points, whether the smartglasses have moved relative to the eye, for example by the smartglasses slipping on the head of the user. In this case, a compensation of the determined optical path length can preferably be carried out, based on the change caused by the movement of the smartglasses relative to the eye, in particular in order to prevent an incorrect interpretation of later measuring samples in the event of further slipping.

The invention furthermore leads to smartglasses which comprise a gaze detection arrangement for determining an eye movement of an eye. The gaze detection arrangement comprises a laser device which is configured to emit at least one laser beam onto the eye, and a control device which is configured to actuate the laser device. In this case, the smartglasses are configured to carry out the described method. In this case, the smartglasses are characterized by a particularly simple and cost-effective design, which has a high detection rate of the eye movements and a low energy requirement.

The laser device preferably comprises at least one surface emitter (also referred to as vertical-cavity surface-emitting laser, VCSEL for short) comprising an integrated photodiode. By means of such a laser device, the gaze movements can be detected in the case of a particularly simple, compact and cost-effective design of the gaze detection arrangement, based on the laser feedback interferometry. A laser device of this kind is suitable in particular for detection by means of the self-mixing effect. In this case, the photodiode preferably detects the superimposition of the emitted radiation and the radiation scattered back, directly inside the laser cavity. The laser device can particularly preferably comprise a plurality of surface emitters, which each emit one laser beam.

Preferably, the at least one surface emitter comprising an integrated photodiode is arranged on a spectacle frame and/or on a temple. In this case, the spectacle frame is considered in particular to be a region of the smartglasses that surrounds a spectacle lens, wherein a temple is considered to be in particular a retainer that is connected to the spectacle frame and extends for example to an ear of the user. For example, a plurality of surface emitters having integrated photodiodes can be arranged on the spectacle frame so as to be distributed around the spectacle lens, as a result of which particularly precise scanning of the eye over its entire movement range can be made possible.

BRIEF DESCRIPTION OF THE DRAWINGS

In the following, the invention will be described on the basis of embodiments, in connection with the figures. In the figures, functionally identical components are denoted by the same reference characters in each case. In the drawings:

FIG. 4 is a further view of eye gestures that can be identified by means of the gaze detection arrangement of FIG. 1.

PREFERRED EMBODIMENTS OF THE INVENTION

Figure 1:
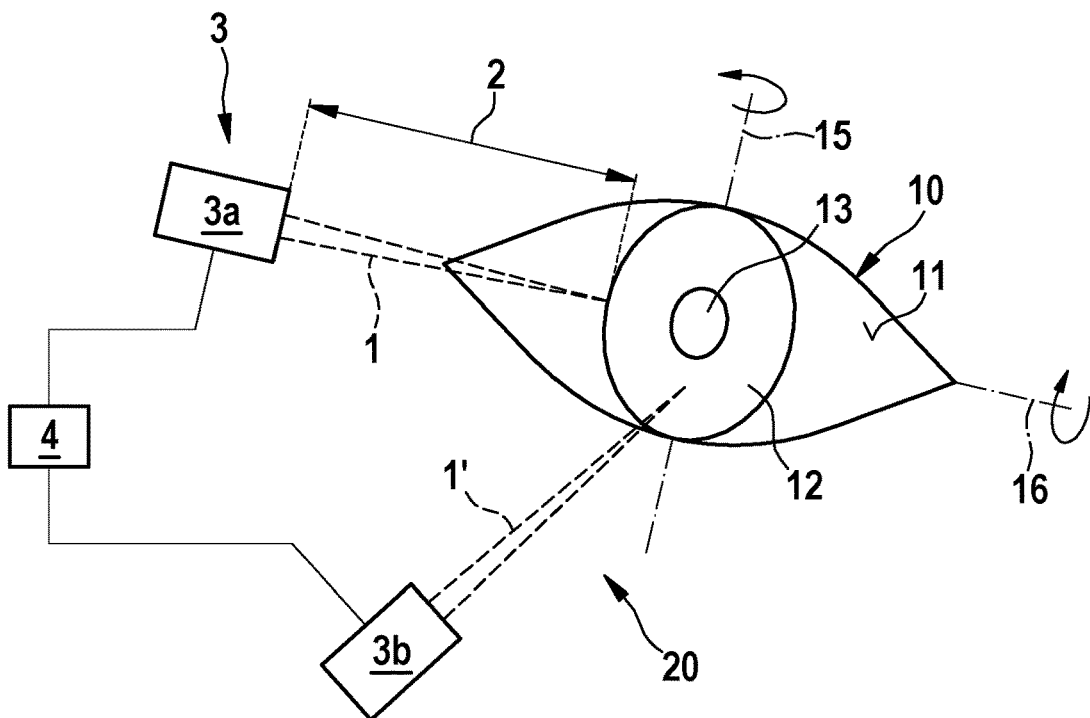
FIG. 1 is a simplified schematic view of a gaze detection arrangement for identifying eye gestures according to a preferred embodiment of the invention.

FIG. 1 is a simplified schematic view of a gaze detection arrangement 20 according to a preferred embodiment of the invention. The gaze detection arrangement 20 comprises a laser device 3 which comprises two surface emitters 3a, 3b having an integrated photodiode. Each of the surface emitters 3a, 3b is configured to emit a laser beam 1, 1' onto an eye 10.

The gaze detection arrangement 20 further comprises a control device 4 which is configured to actuate the surface emitters 3a, 3b. In this case, the gaze detection arrangement 20 is part of smartglasses (not shown), which are configured to carry out a method for identifying eye gestures of the eye 10.

The performance of the method for identifying eye gestures will be described in detail in the following.

Firstly, the laser beam 1, 1' is emitted onto the eye 10. The laser beam 1, 1' is scattered back, at least in part, at the eye surface 11. In this case, superimposition of the laser beam 1, 1' emitted in, with the portion of the radiation scattered back that is propagated back in the direction of the surface emitter 3a, 3b, takes place. A laser feedback interferometry is carried out by means of the surface emitter 3a, 3b and the photodiode integrated in the surface emitter 3a, 3b, in order to detect the resulting interference radiation, i.e. the superimposition of emitted laser radiation 1, 1' and radiation scattered back in the opposite direction. Since the photodiode is integrated directly into the laser cavity of the surface emitter 3a, 3b, the detection of the resulting laser intensity variation or modulation takes place in this case by means of what is known as the self-mixing effect.

Figure 2:
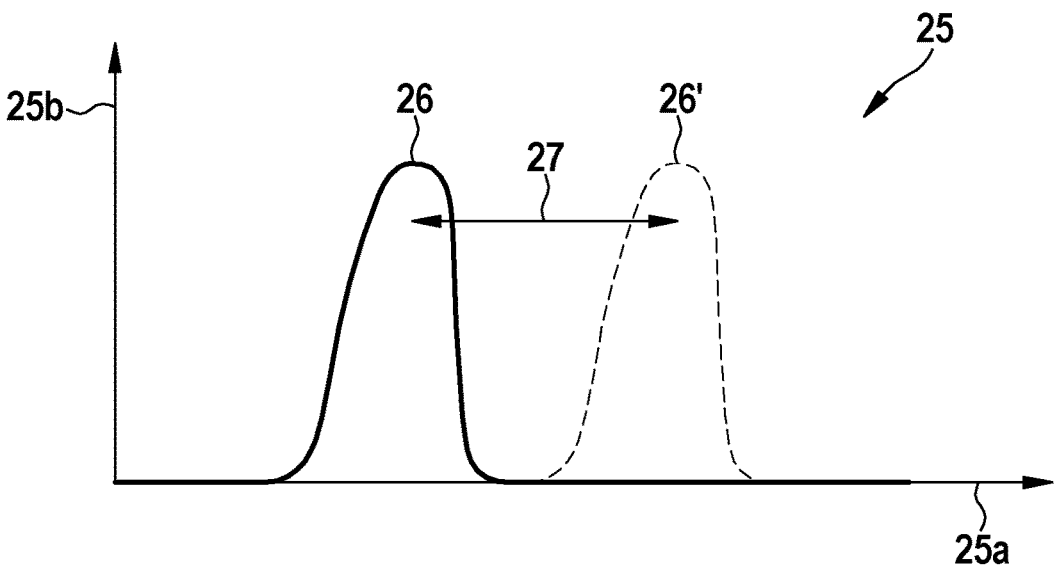
FIG. 2 is a simplified schematic illustration of measurement data of the gaze detection arrangement of FIG. 1, during operation thereof.

A frequency spectrum 25, by way of example, of the resulting interference radiation, which can be detected by means of the integrated photodiode of the surface emitter 3a, 3b, is shown in a schematic and simplified manner in FIG. 2. In this case, the axis 25a corresponds to the frequency, and the axis 25b the amplitude. The reference character 26 denotes the peak frequency of the detected interference radiation, determined for example by means of a Fourier analysis. On account of the triangle-modulation of the wavelength of the emitted laser beam 1, the peak frequency 26 is dependent on an optical path length 2. In this case, the optical path length 2 (cf. FIG. 1) corresponds to a distance travelled by the laser beam 1, 1' between the surface emitters 3a, 3b and the eye 10. Since, in the first embodiment of FIG. 1, the laser beam 1 is emitted directly onto an eye surface 11 of the open eye 10, the optical path length 2 corresponds to the shortest distance between the surface emitter 3a and the eye surface 11. Thus, in the case of a known wavelength of the emitted laser beam 1, the optical path length 2 can be determined, based on the laser feedback interferometry.

In this case, FIG. 2 shows a frequency spectrum 25 by way of example, which is plotted in the case of constant movement of the eye 10 relative to the laser beam 1, in this case during a rotation of the eye 10. In the case of such a movement, on account of the Doppler effect a shift 27 of the peak frequency 26 towards a shifted peak frequency 26', shown dashed, takes place. The Doppler shift, present here, of the emitted laser radiation and the laser radiation scattered back can thus be determined on the basis of the frequency spectrum 25. On the basis of said Doppler shift, the current eye speed of the movement of the eye 10, and a direction of the movement, can be determined.

In addition, a signal-to-noise ratio of the radiation scattered back is detected. On the basis thereof, for example a reflectivity of the eye 10 can be determined. The reflectivity is for example different for different regions of the eye 10. In particular, the determined reflectivity changes if the laser beam 1 strikes different anatomical regions of the eye 10, such as the eyelid 19, iris 12, or retina 14. As a result, it is possible to estimate, on the basis of the reflectivity of the eye 10, the region of the eye 10 on which the laser beam 1 is currently emitted.

In this case, the two laser beams 1, 1' are oriented such that a first laser beam 1 comprises a portion in parallel with a first horizontal axis of rotation 16 of the eye 10, in order to be able to detect a first eye speed vθ along said first axis of rotation 16 (cf. FIG. 1). A second laser beam 1' is oriented such that it comprises a portion in parallel with a second vertical axis of rotation 15 of the eye 10, in order to be able to detect a second eye speed vφ along the second axis of rotation 15. As a result, the eye movements of the eye 10 can be detected completely and easily.

Furthermore, this detection is suitable for calculating an eye angle ε in polar coordinates, on the basis of which the deflection of the eye 10 can be determined and thus, as described below, the eye movements can be distinguished in a simple manner. Furthermore, the magnitude of the eye speed is determined correspondingly in polar coordinates.

In summary, the optical path length 2, the signal-to-noise ratio, and the eye speed of the eye 10 are detected simultaneously, by the laser beam 1 being emitted onto the eye 10. In this case, the current values for these three measured variables in each case form a measuring sample.

Subsequently, the eye gesture of the eye 10 is identified on the basis of a single measuring sample. In detail, the individual measuring sample is analyzed and, on the basis thereof, one of a plurality of predefined basic eye gestures 201, 202, 203, 204, 205, 206, 207 is identified.

Figure 3:
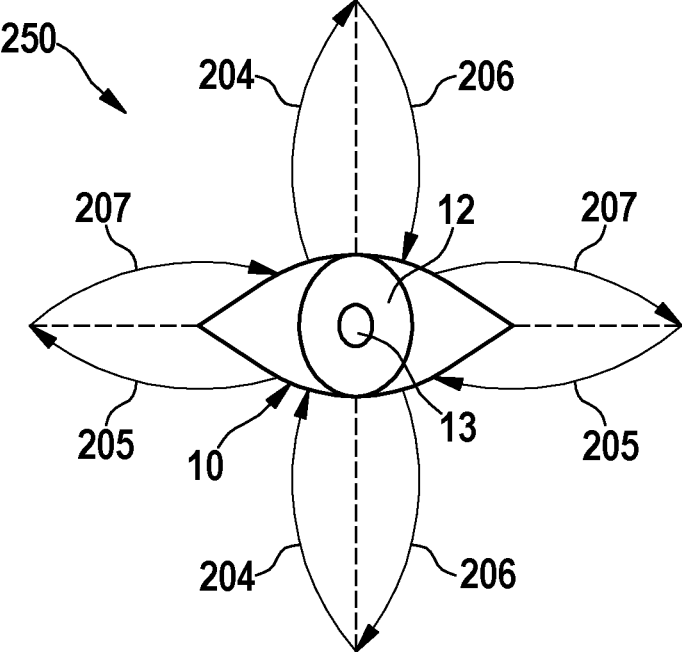
FIG. 3 is a simplified schematic view of eye gestures that can be identified by means of the gaze detection arrangement of FIG. 1.

In FIG. 3, basic eye gestures which define a movement of the open eye 10 are shown in a simplified manner. In this case, in detail, the following basic eye gestures are distinguished: Eye moves upwards 204, eye moves downwards 206, eye moves towards the left 205, and eye moves towards the right 207. In particular, a gaze movement in the corresponding direction is considered to be the respective eye movement.

Furthermore, FIG. 4 shows basic states which can be distinguished based on the optical path length 2 and/or based on the signal-to-noise ratio. In this case, the following basic states are distinguished: Laser beam 1 strikes eye surface 11 or iris 12 (cf. FIG. 4a), laser beam 1 penetrates through the pupil into the eye 10 and strikes the retina 14 (cf. FIG. 4b), and laser beam 1 strikes the eyelid 19 (cf. FIG. 4c). In particular, in this case it is possible to determine, by distinguishing these three basic states, whether the eye 10 is open or is closed by the eyelid 19.

This distinction is carried out based on anatomical boundary conditions of a human eye 10. In detail, for the basic states shown, significantly different optical path lengths 2 result, which differ from one another by the predetermined anatomical boundary conditions of the human eye 10. It is thus possible to determine in a simple manner, for example by comparing the respective optical path length 2, which of the basic states is currently present.

Figure 5:
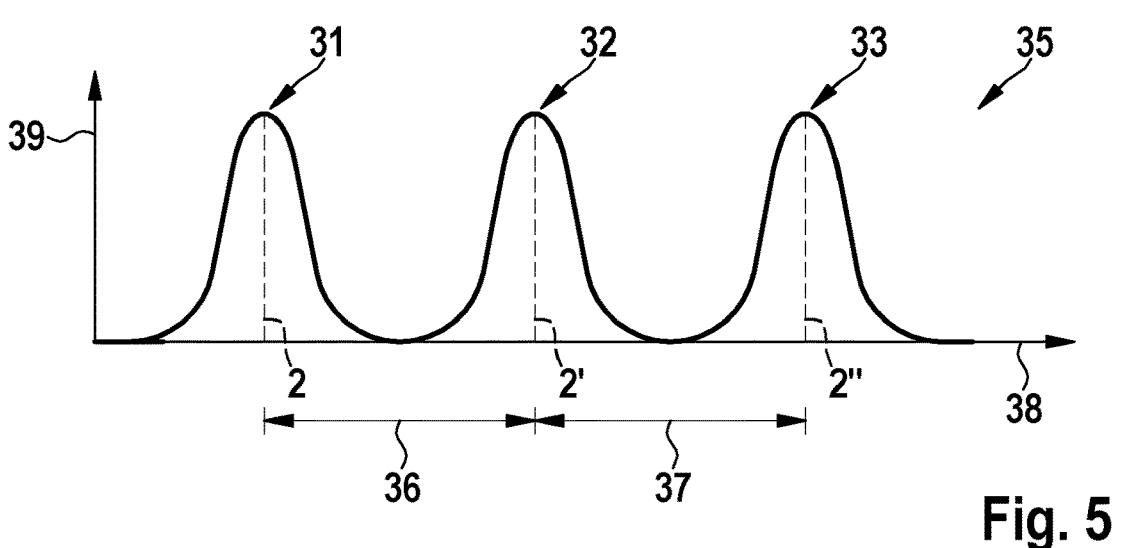
FIG. 5 is a further simplified schematic illustration of measurement data during operation of the gaze detection arrangement of FIG. 1.

FIG. 5 shows a frequency spectrum 35, by way of example, for the optical path lengths 2, 2', 2" for each of these three basic states. In this case, the axis 38 corresponds to the determined optical path length, and the axis 39 corresponds to the frequency of the occurrence of said measured optical path lengths. The determined peak frequencies, which can result for the different basic states, are denoted by reference characters 31, 32, 33. In this case, from left to right, the following basic states are shown by way of example—laser beam strikes eyelid 31, laser beam strikes eye surface or iris 32, and laser beam strikes retina 33. The corresponding optical path length 2, 2', 2" can be estimated on the basis of the respective peak frequency. In this case, differences 36, 37 between these optical path lengths 2 and 2', or 2' and 2", are specified by the anatomical boundary conditions of thickness of the eyelid 19 or eye diameter.

The differences 36, 37 are therefore independent of changes of a distance of the surface emitters 3a, 3b from the eye. That is to say that if, for example, the surface emitters 3a, 3b move away from the eye 10 due to slipping of smartglasses, on which the gaze detection device 20 may be installed, the differences 36, 37 remain substantially the same, such that the three basic states can be distinguished from one another in a simple manner.

Figure 6:
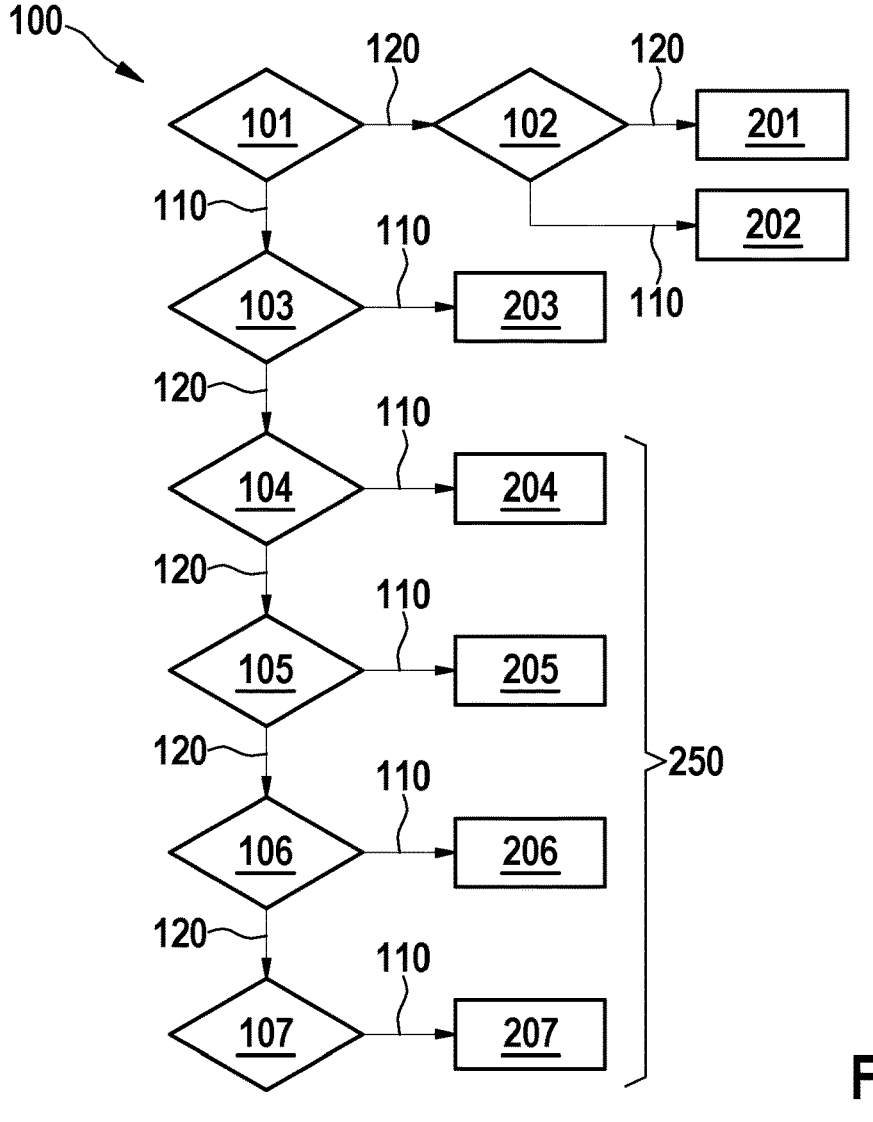
FIG. 6 is a view of a decision tree by means of which the eye gestures are identified.

The determination of which of the predefined basic eye gestures 201, 202, 203, 204, 205, 206, 207 is or was already performed, is determined on the basis of a decision tree 100 which is shown in FIG. 6. In the method steps shown by means of diamond-shaped symbols, in each case a comparison, in particular in the form of greater than, smaller than, or equal to, of at least one of the measured values of the measuring sample with respective predefined values is performed. Depending on whether this comparison is found to be positive (reference character 110) or negative (reference character 120), either a further comparison takes place, or one of the basic eye gestures (rectangular symbols) is determined.

The use of the decision tree 100 is described in detail below. The first step involves the comparison operator 101, in which the magnitude of the current eye speed is compared with a predefined first speed. If the magnitude of the eye speed is less than or equal to the first eye speed, then the comparison operator 101 is negative 120, and the next comparison operator 102 follows, in which the optical path length 2 and/or the signal-to-noise ratio is interpreted. If it follows from the comparison operator 102 that the optical path length 2 and/or signal-to-noise ratio corresponds to a characteristic value, which results when the laser beam 1, 1' strikes the eyelid 19 (cf. FIG. 4a), then the basic eye gesture "closed eye" 202 is identified. In the case of the negative comparison operator 102, a "standstill" 201 of the eye 10 is identified.

If the first comparison operator 101 is positive 110, then, next the comparison operator 103 is carried out, which is substantially identical to the comparison operator 102, i.e. it is determined whether the optical path length 2 and/or signal-to-noise ratio characterize the laser beam 1 striking the eyelid 19. If this is the case, the basic eye gesture "blinking" 203 is identified.

If the comparison operator 103 is negative 120, it is already possible to identify that, in the case of an open eye 10 there is a movement 250 of the eye 10. This movement 250 can be identified more precisely by means of further comparison operators 104, 105, 106, 107, in which the current determined eye angle ε is analyzed in each case. In this case, in detail, the following basic eye gestures are identified:

eye moves upwards 204, if the eye angle ε is greater than or equal to 45° and smaller than 135° (comparison operator 104), eye moves downwards 205, if the eye angle ε is greater than or equal to 225° and smaller than 315° (comparison operator 105), eye moves towards the left 206, if the eye angle ε is greater than or equal to 135° and smaller than 225° (comparison operator 106), eye moves towards the right 207, if the eye angle ε is greater than or equal to 315° and smaller than 45° (comparison operator 107).

The decision tree 100 thus offers a particularly simple analysis of the measuring sample, which can be carried out with little computational effort, in order to identify the predefined basic eye gestures 201, 202, 203, 204, 205, 206, 207.

Figure 7:
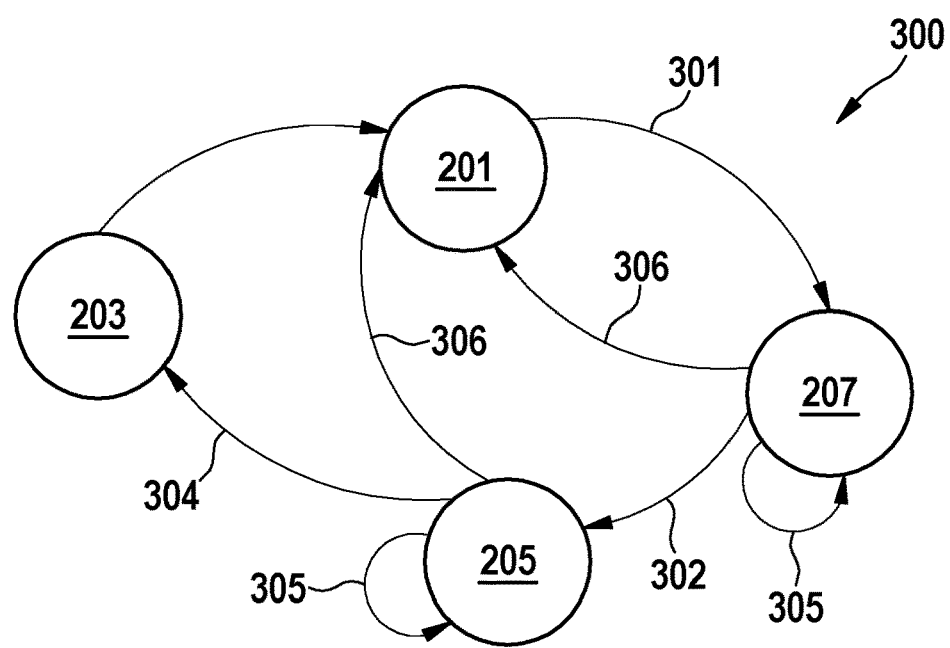
FIG. 7 is a schematic view of a state machine by means of which complex eye gestures are identified.

A development of the method can be achieved in that a state machine 300, which is shown by way of example in FIG. 7, is used to identify complex eye gestures. In this case, a complex eye gesture is defined by a predefined sequence of basic eye gestures carried out in succession.

In this case, FIG. 7 shows a state machine 300 for identifying the complex eye gesture "eye moves towards the right 207; eye moves towards the left 205; blinking 203". In this case, the circles denote states in which the corresponding basic eye gestures were identified, analogously to FIG. 6. The connections characterize the corresponding gaze movements of the user, i.e. gaze towards the right 301, gaze towards the left 302, and closing the eyelid 19.

If, proceeding from one of the states 207 or 206, a basic eye gesture different from those suitable for carrying out the complex eye gesture is performed and identified, then either a pause 305 in the current state takes place, if there is no eye movement, or if the same eye gesture is carried out repeatedly in order to reach this state. Alternatively, if a different basic eye gesture is performed, there is a return 306 to the starting state 201.

A further possible development of the method is an additional calibration, which can be used for example for filtering out implausible, and thus sometimes incorrect, measuring samples. This is described with reference to FIGS. 8 and 9.

Figure 8:
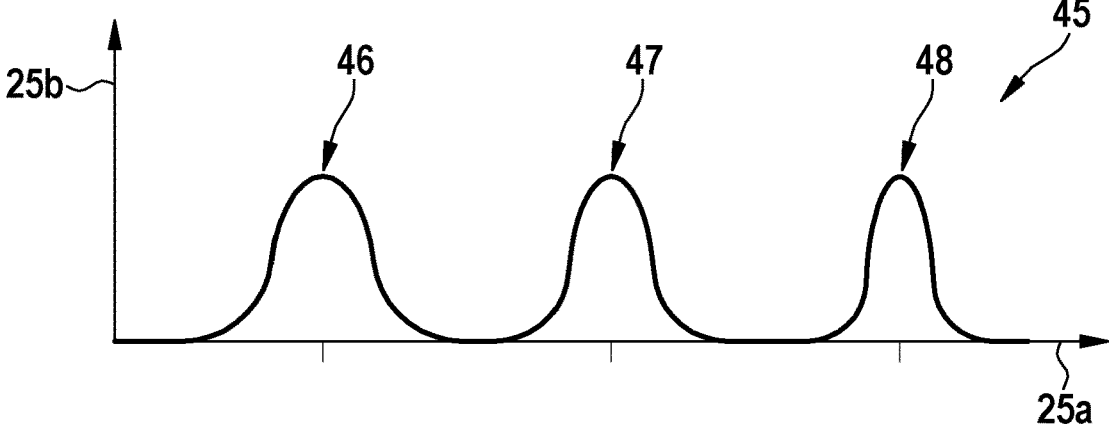
FIG. 8 is a further simplified schematic illustration of measurement data during operation of the gaze detection arrangement of FIG. 1.

FIG. 8 shows a frequency spectrum 45, by way of example, for respective signal-to-noise ratios for each of the three basic states mentioned above. In this case, the axis 25a corresponds to the frequency, and the axis 25b the amplitude. The reference characters 46, 47, 48 characterize the peak frequencies determined in each case for the three basic states, i.e. laser beam strikes eyelid 46, laser beam strikes eye surface or iris 47, and laser beam strikes retina 48.

The frequency spectrum by way of example, shown in FIG. 8, can be detected once in a calibration step, in order to in each case obtain a calibration signal-to-noise ratio 46, 47, 48 for each of the three basic states. The signal-to-noise ratio is independent of the distance from the surface emitters 3a, 3b to the eye 10. As a result, the plausibility of the determined measuring sample can be checked on the basis of the calibration signal-to-noise ratios 46, 47, 48.

Figure 9:
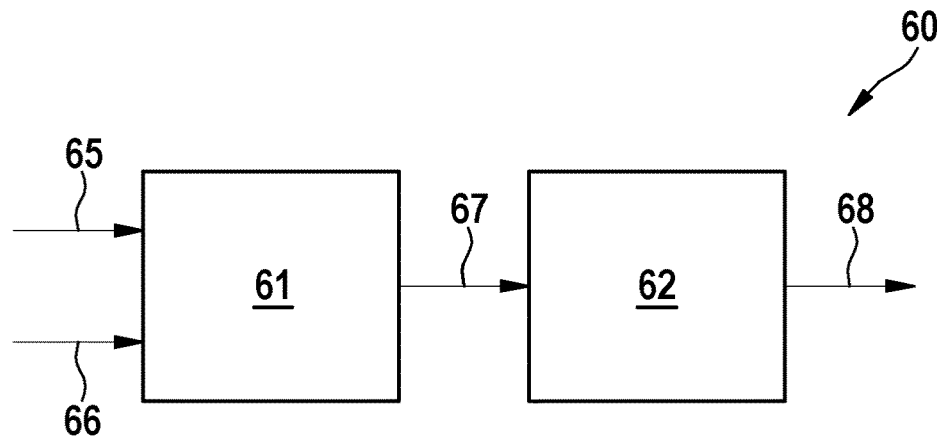
FIG. 9 is a simplified schematic view of filtering of measurement data.

This takes place as part of a calibration method 60 shown in FIG. 9. The calibration method 60 comprises the step of checking the plausibility 61 of the determined measuring sample. In this case, the current values for the optical path length 2 and the signal-to-noise ratio are provided at the inputs 65 or 66 of this step. In this case, the current signal-to-noise ratio is compared with the calibration signal-to-noise ratios 46, 47, 48. If the current signal-to-noise ratio at least largely corresponds with one of the calibration signal-to-noise ratios 46, 47, 48, then the current measuring sample is considered plausible and is further processed; otherwise, the current measuring sample is considered incorrect and is rejected.

If the measuring sample is plausible, the optical path length is further processed and supplied to the input 67 of the next step 62, in which the current optical path length is assigned to one of the three basic states, for example based on FIG. 5. Correspondingly, at the output 68, the assigned optical path length or information about which of the three basic states is currently present, is output.

Figure 10:
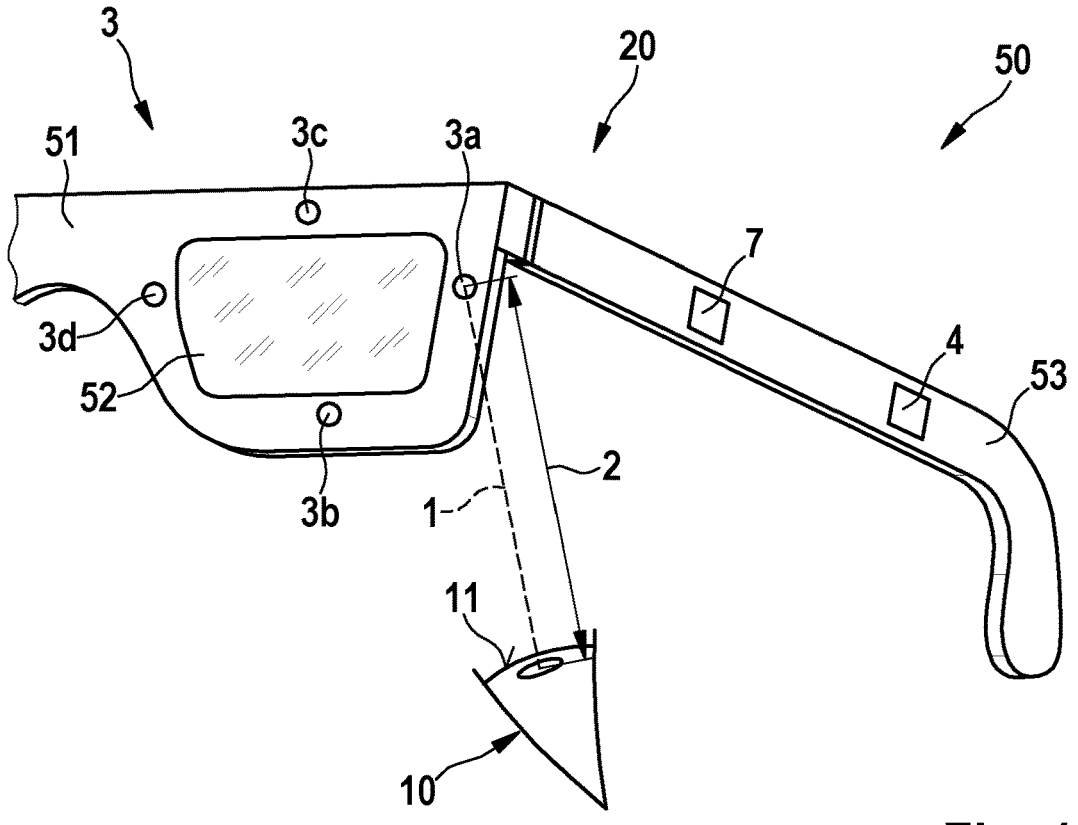
FIG. 10 is a simplified schematic view of smartglasses comprising the gaze detection arrangement of FIG. 1.

An application of the method and a use of the gaze detection arrangement 20 in smartglasses 50 is shown in FIG. 10.

The smartglasses 50 comprise a spectacle lens 52, a spectacle frame 51 in which the spectacle lens 52 is received, and a temple 53 which serves for holding the smartglasses 50 on a head of a user. The smartglasses 50 are thus provided for being worn on the head of the user.

The smartglasses 50 comprise the gaze detection arrangement 20. For a compact design of the smartglasses 50, the control device 4 is arranged in the temple 53.

The surface emitters 3a, 3b of the laser device 3 are arranged on the spectacle frame 51 in a manner distributed around the spectacle lens 52.

Furthermore, the smartglasses 50 can comprise an input and/or output device 7, which is configured to output an output to the user. In this case, the input and/or output device 7 comprises a projection unit which is configured to project an image on a retina of the eye 10. The projection unit can be used for example for displaying an augmented reality (AR) or virtual reality. Preferably, the projection unit is coupled to the control device 4, wherein the control device 4 is configured to actuate the projection unit depending on the determined eye gestures.

The invention claimed is:

1. A method for identifying eye gestures of an eye, comprising the steps of:
   emitting at least one laser beam onto the eye,
   determining a single measuring sample having current values for:
      an optical path length of the emitted laser beam;
      a signal-to-noise ratio of radiation scattered back from the eye;
      an eye speed of the eye; and
   identifying an eye gesture based on the single measuring sample,
   wherein the optical path length is determined based on laser feedback interferometry of the emitted laser radiation with the radiation scattered back from the eye, and
   wherein the eye speed is determined based on a Doppler shift, which is determined by means of the laser feedback interferometry, of the radiation emitted and scattered back.

2. The method according to claim 1, wherein predefined basic eye gestures are identified based on an interpretation of the measuring sample by means of a decision tree.

3. The method according to claim 2, wherein predefined complex eye gestures are identified by means of a state machine, and wherein a complex eye gesture comprises a plurality of successive basic eye gestures.

4. The method according to claim 1, wherein the following predefined basic states are distinguished based on the optical path length and/or based on the signal-to-noise ratio:
   laser beam strikes eyelid,
   laser beam strikes eye surface or iris,
   laser beam strikes retina.

5. The method according to claim 4, wherein the predefined basic states are additionally distinguished based on anatomical boundary conditions of a human eye.

6. The method according to claim 4, further comprising the steps of:
   calibration by recording in each case a calibration signal-to-noise ratio for each of the three basic states, and
   checking the plausibility of the determined measuring sample by comparing the current signal-to-noise ratio with the calibration signal-to-noise ratios.

7. The method according to claim 1, further comprising the steps of:
   comparing the eye speed with a first speed, and
   identifying a standstill of the eye or an eye that is closed by an eyelid if the eye speed is less than or equal to the first speed.

8. The method according to claim 1, further comprising the steps of:
   comparing the eye speed with a first speed, and
   identifying a movement of the eye or a blink if the eye speed is greater than the first speed.

9. The method according to claim 8, further comprising the steps of:
   comparing the eye speed with a second speed, and
   identifying a slow eye movement of the eye if the eye speed is less than or equal to the second speed, or
   identifying a rapid eye movement of the eye if the eye speed is greater than the second speed.

10. The method according to claim 1, wherein two laser beams are emitted onto the eye, wherein a first laser beam is emitted onto the eye such that it comprises a portion in parallel with a first axis of rotation of the eye in order to detect a first eye speed $v\theta$ along the first axis of rotation, and wherein a second laser beam is emitted onto the eye such that it comprises a portion in parallel with a second axis of rotation of the eye in order to detect a second eye speed $v\varphi$ along the second axis of rotation.

11. The method according to claim 10, further comprising the step of:
   determining an eye angle $\varepsilon$ based on the equation:

$$\varepsilon = \arctan\left(\frac{v\theta}{v\varphi}\right),$$

with the first eye speed $v\theta$ and the second eye speed $v\varphi$.

12. The method according to claim 11, wherein the following eye gestures are distinguished based on the eye angle $\varepsilon$:
   eye moves upwards if the eye angle $\varepsilon$ is greater than or equal to 45° and smaller than 135°,
   eye moves downwards if the eye angle $\varepsilon$ is greater than or equal to 225° and smaller than 315°,
   eye moves towards the left if the eye angle $\varepsilon$ is greater than or equal to 135° and smaller than 225°,
   eye moves towards the right if the eye angle $\varepsilon$ is greater than or equal to 315° and smaller than 45°.

13. The method according to claim 10, further comprising the step of:
   determining a magnitude v of the eye speed based on the equation:

$$v = \sqrt{v\theta^2 + v\varphi^2},$$

with the first eye speed $v\theta$ and the second eye speed $v\varphi$.

14. The method according to claim 1, wherein the method is used for operating smartglasses, and furthermore comprises the step of:

identifying a movement of the smartglasses relative to the eye based on the optical path lengths of at least two measuring samples.

15. Smartglasses, comprising a gaze detection arrangement for determining an eye movement of an eye, wherein the gaze detection arrangement comprises a laser device which is configured to emit at least one laser beam onto the eye, and a control device which is configured to actuate the laser device, and wherein the smartglasses are configured to carry out the method according to claim 1.

\* \* \* \* \*